United States Patent
Nii

(10) Patent No.: US 12,492,272 B2
(45) Date of Patent: Dec. 9, 2025

(54) MODIFIED VINYL ALCOHOL POLYMER, AQUEOUS SOLUTION, AND METHOD FOR PRODUCING MODIFIED VINYL ALCOHOL POLYMER

(71) Applicant: KURARAY CO., LTD., Okayama (JP)

(72) Inventor: Shinsuke Nii, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 260 days.

(21) Appl. No.: 18/013,063

(22) PCT Filed: Jun. 28, 2021

(86) PCT No.: PCT/JP2021/024309
§ 371 (c)(1),
(2) Date: Dec. 27, 2022

(87) PCT Pub. No.: WO2022/004636
PCT Pub. Date: Jan. 6, 2022

(65) Prior Publication Data
US 2023/0242688 A1 Aug. 3, 2023

(30) Foreign Application Priority Data
Jun. 30, 2020 (JP) .................. 2020-112539

(51) Int. Cl.
C08F 16/06 (2006.01)
C08F 2/06 (2006.01)
C08F 8/12 (2006.01)
C08F 8/42 (2006.01)

(52) U.S. Cl.
CPC ............... C08F 16/06 (2013.01); C08F 2/06 (2013.01); C08F 8/12 (2013.01); C08F 8/42 (2013.01)

(58) Field of Classification Search
CPC ........... C08F 16/06; C08F 30/08; C08F 8/42
See application file for complete search history.

(56) References Cited

U.S. PATENT DOCUMENTS

| | | | |
|---|---|---|---|
| 6,962,955 | B2 | 11/2005 | Kusudou et al. |
| 2004/0009357 | A1 | 1/2004 | Kusudou et al. |
| 2004/0054069 | A1 | 3/2004 | Kusudou et al. |
| 2005/0143547 | A1* | 6/2005 | Stark ..................... C08F 283/12 528/33 |
| 2005/0175795 | A1 | 8/2005 | Kusudou et al. |
| 2014/0235778 | A1 | 8/2014 | Taoka et al. |

FOREIGN PATENT DOCUMENTS

| | | |
|---|---|---|
| CN | 1887921 A | 1/2007 |
| CN | 103797065 A | 5/2014 |
| CN | 104356792 A | 2/2015 |
| JP | H05-016550 A | 1/1993 |
| JP | H06-122282 A | 5/1994 |
| JP | H06-248228 A | 9/1994 |
| JP | 2000-063751 A | 2/2000 |
| JP | 2004-043644 A | 2/2004 |
| JP | 2004-043817 A | 2/2004 |
| JP | 2004-091774 A | 3/2004 |
| JP | 2005-194437 A | 7/2005 |
| JP | 2005-194471 A | 7/2005 |
| JP | 2005-194600 A | 7/2005 |

OTHER PUBLICATIONS

Tezuka, Polymer, 1986, vol. 27, January, p. 123-128 (Year: 1986).*
Tezuka, Makromol. Chem. 186, p. 685-694 (1985) (Year: 1985).*
International Search Report issued in corresponding International Patent Application No. PCT/JP2021/024309 dated Sep. 14, 2021.
Written Opinion issued in corresponding International Patent Application No. PCT/JP2021/024309 dated Sep. 14, 2021.

* cited by examiner

Primary Examiner — Robert C Boyle
(74) Attorney, Agent, or Firm — Morgan, Lewis & Bockius LLP

(57) ABSTRACT

Provided is a modified vinyl alcohol polymer which is superior in water solubility, viscosity stability of an aqueous solution thereof, and water resistance of a film thereof. The modified vinyl alcohol polymer has a group represented by the following formula (1). In the formula (1), $R^1$ represents: an alkyl group having 1 to 8 carbon atoms; an alkoxy group having an alkyl group having 1 to 8 carbon atoms; a hydroxy group; or a group represented by –OM, wherein M represents an alkali metal or an alkaline earth metal, $R^2$ represents a group including a siloxane structure, and n is an integer of 1 to 3.

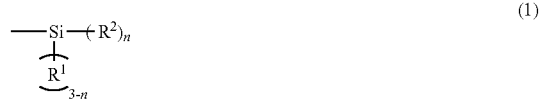

(1)

20 Claims, No Drawings

MODIFIED VINYL ALCOHOL POLYMER, AQUEOUS SOLUTION, AND METHOD FOR PRODUCING MODIFIED VINYL ALCOHOL POLYMER

TECHNICAL FIELD

The present disclosure relates to a modified vinyl alcohol polymer, an aqueous solution, and a method for producing a modified vinyl alcohol polymer.

BACKGROUND ART

Vinyl alcohol polymers (hereinafter, "vinyl alcohol polymer" may be abbreviated to "PVA") are synthetic resins obtained by saponifying a vinyl ester polymer. PVAs have water solubility, and are used for usage purposes such as synthetic fiber materials, film materials, emulsion dispersants, adhesives, and the like.

As a vinyl alcohol polymer having a silyl group, each of Patent Documents 1 and 2 discloses a vinyl alcohol polymer having a specific silyl group.

PRIOR ART DOCUMENTS

Patent Documents

Patent Document 1: Japanese Unexamined Patent Application, Publication No. 2004-043817
Patent Document 2: Japanese Unexamined Patent Application, Publication No. 2004-091774

SUMMARY OF THE INVENTION

Problems to be Solved by the Invention

The vinyl alcohol polymer having a silyl group has characteristics such as a film obtained from an aqueous solution thereof being superior in water resistance, an ability to bind with an inorganic substance, and the like. On the other hand, the vinyl alcohol polymer having a silyl group may have problems such as decreased water solubility, impaired viscosity stability, and the like, due to high reactivity of the silyl group.

It is an object of the present disclosure to provide: a modified vinyl alcohol polymer superior in water solubility, viscosity stability of an aqueous solution thereof, and water resistance of a film thereof; a method for producing such a modified vinyl alcohol polymer; and an aqueous solution containing such a modified vinyl alcohol polymer.

Means for Solving the Problems

As a result of thorough investigation, the present inventor has found that the above-described problems are solved by using a modified vinyl alcohol polymer having a group with a specific structure, thereby completing the invention.

More specifically, the present invention includes modes as disclosed below:

(1) A modified vinyl alcohol polymer having a group represented by the following formula (1):

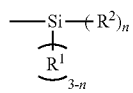

(1)

wherein, in the above formula (1),
R$^1$ represents: an alkyl group having 1 to 8 carbon atoms; an alkoxy group having an alkyl group having 1 to 8 carbon atoms; a hydroxy group; or a group represented by –OM, wherein M represents an alkali metal or an alkaline earth metal,
R$^2$ represents a group including a siloxane structure, and
n is an integer of 1 to 3,
wherein in a case of the group comprising a plurality of R$^1$s, R$^1$s may be identical or different from each other, and in a case of the group comprising a plurality of R$^2$s, R$^2$s may be identical or different from each other;

(2) The modified vinyl alcohol polymer according to (1), wherein R$^2$ represents a group represented by the following formula (2):

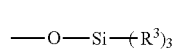

(2)

wherein, in the above formula (2), R$^3$s each independently represent: an alkyl group having 1 to 20 carbon atoms; an alkoxy group having an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal;

(3) The modified vinyl alcohol polymer according to (1) or (2), wherein a content of the siloxane structure with respect to total monomer units in the modified vinyl alcohol polymer is 0.001 mol % or more;

(4) The modified vinyl alcohol polymer according to any one of (1) to (3), wherein a content of the siloxane structure with respect to a total of a monomer unit derived from a silyl group-containing monomer in the modified vinyl alcohol polymer is 50 mol % or more;

(5) A modified vinyl alcohol polymer having a monomer unit which is derived from a silyl group-containing monomer and modified with a silane coupling agent;

(6) The modified vinyl alcohol polymer according to (5), wherein a degree of modification with the silane coupling agent with respect to total monomer units in the modified vinyl alcohol polymer is 0.001 mol % or more;

(7) The modified vinyl alcohol polymer according to (5) or (6), wherein a degree of modification with the silane coupling agent with respect to a total of the monomer unit derived from the silyl-containing monomer in the modified vinyl alcohol polymer is 50 mol % or more;

(8) A method for producing a modified vinyl alcohol polymer, the method comprising a step of saponifying, in the presence of a silane coupling agent, a modified vinyl ester polymer comprising a silyl group; and (9) An aqueous solution containing the modified vinyl alcohol polymer according to any one of (1) to (7).

Effects of the Invention

According to the present disclosure, the following can be provided: a modified vinyl alcohol polymer superior in water solubility, viscosity stability of an aqueous solution thereof, and water resistance of a film thereof; a method for producing such a modified vinyl alcohol polymer; and an aqueous solution containing such a modified vinyl alcohol polymer.

DESCRIPTION OF EMBODIMENTS

Modified Vinyl Alcohol Polymer

The vinyl alcohol polymer (PVA) is a polymer having a vinyl alcohol unit as a monomer unit. The PVA is obtained by saponifying a vinyl ester polymer obtained by polymerizing a vinyl ester monomer, being a raw material monomer, and the PVA after the saponification may include vinyl ester unit(s) in addition to the vinyl alcohol unit.

Furthermore, the PVA may be: a PVA in which a copolymer obtained by copolymerizing the vinyl ester monomer, being the raw material monomer, with another monomer is saponified, resulting in containing other monomer unit(s) aside from the vinyl alcohol unit and the vinyl ester unit; or a PVA in which a certain functional group is introduced by allowing a certain chemical species to react with the PVA during or after saponification. In the present disclosure, such a PVA is referred to as the "modified vinyl alcohol polymer (modified PVA)"; and furthermore, monomer(s) other than the vinyl ester monomer, which is the raw material monomer of the PVA and includes monomer unit(s) other than the vinyl alcohol unit and the vinyl ester unit, may be referred to as "modifying species". Moreover, in the present disclosure, the (modified) vinyl ester polymer before saponifying the (modified) PVA may be referred to as a "precursor" of the (modified) PVA. It is to be noted that as referred to herein, the "modified vinyl ester polymer" means the vinyl ester polymer containing the other monomer unit(s) aside from the vinyl ester unit.

The modified vinyl alcohol polymer (modified PVA) of the present disclosure has a group represented by the following formula (1).

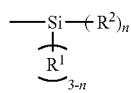

In the Above Formula (1),
R$^1$ represents: an alkyl group having 1 to 8 carbon atoms; an alkoxy group having an alkyl group having 1 to 8 carbon atoms; a hydroxy group; or a group represented by –OM, wherein M represents an alkali metal or an alkaline earth metal,
R$^2$ represents a group including a siloxane structure, and n is an integer of 1 to 3,
wherein in a case of the group comprising a plurality of R$^1$s, R$^1$s may be identical or different from each other, and in a case of the group comprising a plurality of R$^2$s, R$^2$s may be identical or different from each other.

Due to the modified PVA having the group represented by the above formula (1), the water solubility of the modified PVA, the viscosity stability of the aqueous solution of the modified PVA, and the water resistance of the film formed from the modified PVA improve. A reason therefor is not necessarily clarified, but it is presumed that due to the modified PVA having the group represented by the formula (1), a vicinity of a moiety (for example, a silanol moiety) having high reactivity and containing a silicon atom becomes bulky, whereby, in the modified PVA, interactivity of the moiety having the high reactivity and containing the silicon atom with a vinyl alcohol moiety is appropriately weakened.

In the present disclosure, the "siloxane structure" as referred to means a structure (—O—Si—) resulting from one oxygen atom binding with one silicon atom. The siloxane structure may be referred to as a siloxane bond. Of four atomic bonds of one silicon atom constituting one siloxane structure, types of atoms bonded in the three atomic bonds not being bonded to the oxygen atom constituting the siloxane bond are not particularly limited. Of two atomic bonds of one oxygen atom constituting one siloxane structure, a type of atom bonded in the atomic bond not being bonded to the oxygen atom constituting the siloxane bond is not particularly limited. However, of the two atomic bonds of the one oxygen atom constituting the one siloxane structure, the atomic bond not being bonded to the oxygen atom constituting the siloxane bond is preferably also bonded to a different silicon atom. The different silicon atom is preferably the silicon atom represented by Si in the formula (1).

Examples of the alkyl group having 1 to 8 carbon atoms which may be represented by R$^1$ include a methyl group, an ethyl group, a propyl group, a butyl group, and the like. The number of carbon atoms in this alkyl group is preferably 1 to 4, and more preferably 1 or 2.

Examples of the alkoxy group having an alkyl group having 1 to 8 carbon atoms which may be represented by R$^1$ include a methoxy group, an ethoxy group, a propoxy group, a butoxy group, and the like. The number of carbon atoms in the alkyl group contained in the alkoxy group is preferably 1 to 4, and more preferably 1 or 2.

Examples of the alkali metal which may be represented by M include sodium, potassium, and the like. Examples of the alkaline earth metal which may be represented by M include magnesium, calcium, and the like.

In the case in which n in the formula (1) is 1 or 2, one or two R$^1$s preferably include: the alkoxy group having the alkyl group having 1 to 8 carbon atoms; a hydroxy group; or a group represented by –OM. Furthermore, R$^1$ represents preferably: the alkoxy group having the alkyl group having 1 to 8 carbon atoms; a hydroxy group; or a group represented by –OM.

The group (the group including a siloxane structure) represented by R$^2$ in the formula (1) is preferably a group resulting from an oxygen atom constituting the siloxane structure bonding to the silicon atom represented by Si in the formula (1), and more preferably a group represented by the following formula (2). The group represented by R$^2$ may otherwise be a group containing a plurality of siloxane structures (for example, a polysiloxane chain), or the like.

In the above formula (2), R$^3$s each independently represent: an alkyl group having 1 to 20 carbon atoms; an alkoxy group having an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal.

Examples of the alkyl group having 1 to 20 carbon atoms which may be represented by $R^3$ include those exemplified as the alkyl group having 1 to 8 carbon atoms which may be represented by $R^1$, and the like. The number of carbon atoms in the alkyl group which may be represented by $R^3$ is preferably 1 to 8, more preferably 1 to 4, and still more preferably 1 or 2.

Examples of the alkoxy group having the alkyl group having 1 to 8 carbon atoms which may be represented by $R^3$ include those exemplified as the alkoxy group having the alkyl group having 1 to 8 carbon atoms which may be represented by $R^1$, and the like. The number of carbon atoms in the alkyl group contained in the alkoxy group which may be represented by $R^3$ is preferably 1 to 4, and more preferably 1 or 2.

Examples of the alkenyl group having 2 to 5 carbon atoms which may be represented by $R^3$ include a vinyl group, an allyl group, a 2-methylallyl group, and the like. The number of carbon atoms in the alkenyl group which may be represented by $R^3$ is preferably 2 to 4, and more preferably 2.

Examples of the halogen contained in the halogenated alkyl group having 1 to 8 carbon atoms and the halogenated phenyl, each of which may be represented by $R^3$, include fluorine, chlorine, bromine, and the like.

Examples of the aminoalkyl group having 1 to 8 carbon atoms which may be represented by $R^3$ include an aminomethyl group, a 2-aminoethyl group, a 3-aminopropyl group, and the like. The number of carbon atoms in the aminoalkyl group which may be represented by $R^3$ is preferably 1 to 4.

Examples of the mercaptoalkyl group having 1 to 8 carbon atoms which may be represented by $R^3$ include a mercaptomethyl group, a 2-mercaptoethyl group, a 3-mercaptopropyl group, and the like. The number of carbon atoms in the mercaptoalkyl group which may be represented by $R^3$ is preferably 1 to 4.

Examples of the alkali metal which may be represented by Q include sodium, potassium, and the like. Examples of the alkaline earth metal which may be represented by Q include magnesium, calcium, and the like.

Among the three $R^3$s in the formula (2), the alkoxy group is preferably included. The number of the alkoxy group(s) among the three $R^3$s in the formula (2) is preferably 1 or 2. In light of the viscosity stability, the number of the alkoxy group(s) among the three $R^3$s in the formula (2) is preferably 1. In light of the water resistance of the film, the number of the alkoxy group(s) among the three $R^3$s in the formula (2) is preferably 2.

n in the formula (1) is preferably 1 or 2, and more preferably 1.

The lower limit of a content of the group represented by the formula (1) with respect to total monomer units in the modified PVA is preferably 0.001 mol %, more preferably 0.005 mol %, still more preferably 0.01 mol %, yet more preferably 0.05 mol %, further preferably 0.10 mol %, and may be particularly preferably 0.16 mol %. Furthermore, the upper limit of the content of the group represented by the formula (1) with respect to the total monomer units is not particularly limited, and may be, for example, 0.30 mol %, or may be 0.25 mol %. Moreover, for example, in the modified PVA of one embodiment, described later, a content of the group represented by the formula (1) may have the same value as a degree of modification with the silyl group. In other words, for example, all of the monomer unit derived from a silyl group-containing modifying species introduced into the modified PVA may have the group represented by the formula (1).

In the present disclosure, "monomer unit" means a minimum repeating unit derived from a monomer and having a part containing a main chain. One monomer unit may be formed from only one monomer, or may be formed from one monomer and one or a plurality of other compound(s) (for example, the silane coupling agent, described later, and/or the like).

The lower limit of a content of the siloxane structure (—O—Si—) with respect to the total monomer units in the modified PVA is preferably 0.001 mol %, more preferably 0.005 mol %, still more preferably 0.01 mol %, yet more preferably 0.05 mol %, further preferably 0.10 mol %, and may be particularly preferably 0.16 mol %. Furthermore, the upper limit of the content of the siloxane structure with respect to the total monomer units is not particularly limited, and may be, for example, 0.30 mol %, or may be 0.25 mol %.

The lower limit of a content of the group represented by the formula (2) with respect to the total monomer units in the modified PVA is preferably 0.001 mol %, more preferably 0.005 mol %, still more preferably 0.01 mol %, yet more preferably 0.05 mol %, further preferably 0.10 mol %, and may be particularly preferably 0.16 mol %. Furthermore, the upper limit of the content of the group represented by the formula (2) with respect to the total monomer units is not particularly limited, and may be, for example, 0.30 mol %, or may be 0.25 mol %. It is to be noted that in a case in which $R^2$ in the above formula (1) is the group represented by the above formula (2), as long as no other modification, etc. has been performed, typically, the content of the group represented by the above formula (2) is equal to the content of the siloxane structure.

The group represented by the formula (1) or the siloxane structure, each being in the modified PVA, can be measured using, for example, $^1$H-NMR. For example, in a case of the modified PVA obtained by saponifying a copolymer of vinyl acetate and vinyltrimethoxysilane in the presence of methyltrimethoxysilane, being one mode of the modified PVA of the present disclosure, the siloxane structure can be confirmed from a structure derived from methyltrimethoxysilane in the PVA, measured using $^1$H-NMR. An example of a specific measuring procedure in this case is as described hereafter. When a sample of the modified PVA dissolved in $D_2O$ is measured at room temperature using $^1$H-NMR at 400 MHz, a methine group-derived peak of the vinyl alcohol unit is attributed to 3.3 to 4.2 ppm (integrated value $\alpha$), and a methyl group-derived peak in the structure derived from methyltrimethoxysilane is attributed to about −0.5 to 0.5 ppm (integrated value $\beta$).

From the integrated values $\alpha$ and $\beta$, the content of the structure derived from methyltrimethoxysilane, i.e., the content of the siloxane structure, with respect to the total monomer units can be calculated according to the following formula (I):

$$\text{content of siloxane structure(structure derived from methyltrimethoxysilane)(mol \%)} = \{(\beta/3)/(\alpha+\beta/3)\} \times 100 \quad (I)$$

The content determined by the above procedure is equal to the content of the Si—O—Si structure. Furthermore, in the case of the modified PVA obtained by saponifying the copolymer of vinyl acetate and vinyltrimethoxysilane in the presence of methyltrimethoxysilane, the content of the siloxane structure with respect to the total monomer units, determined by the above procedure, is equal to the content of the group represented by the formula (2) with respect to the total monomer units. Moreover, in the case of the modified PVA obtained by saponifying the copolymer of vinyl acetate and vinyltrimethoxysilane in the presence of methyltrimethoxysilane, it is believed that two or more methyltrimethyoxysilanes are unlikely to react with one monomer unit derived from vinyltrimethoxysilane, in relation to, e.g., steric hindrance. In other words, it is believed that n in the above formula (1) is typically 1. Thus, it is considered that the content of the siloxane structure with respect to the total monomer units, determined by the above procedure, is substantially equal to the content of the group represented by the formula (1) with respect to the total monomer units.

The modified PVA in the present disclosure typically has a monomer unit having the group represented by the above formula (1). The monomer unit having the group represented by the above formula (1) is exemplified by a monomer unit represented by the following formula (3).

(3)

In the formula (3), $R^4$ represents a hydrogen atom or a methyl group; $R^5$ represents a single bond or a divalent linking group; and $R^6$ represents the group represented by the above formula (1).

Examples of the divalent linking group which may be represented by $R^5$ include —$(CH_2)_m$— (wherein m is an integer of 1 to 4), —$CONR^7$—$(CH_2)_q$— (wherein $R^7$ represents a hydrogen atom or a methyl group; and q is an integer of 0 to 4), and the like. Furthermore, the divalent linking group may contain a divalent heteroatom-containing group such as —O—, —$NR^8$— (wherein $R^8$ represents a hydrogen atom or a methyl group), or the like between two adjacent carbon atoms in the groups represented by —$(CH_2)_m$— and —$CONR^7$—$(CH_2)_q$— above.

A preferred embodiment of the modified PVA in the present disclosure is a modified PVA obtained by saponifying, in the presence of a silane coupling agent, a modified vinyl ester polymer (hereinafter, also referred to as "silyl group-modified vinyl ester polymer") obtained by copolymerizing a monomer having a silyl group (hereinafter, also referred to as "silyl group-containing monomer" or "silyl group-containing modifying species") with the vinyl ester monomer, and introducing the group represented by the formula (1) into a side chain of the PVA. In other words, the modified PVA having a monomer which is derived from the silyl group-containing monomer and modified with the silane coupling agent is also one mode of the modified PVA in the present disclosure.

As referred to in the present disclosure, "silyl group" means a group represented by —$SiH_3$, and a group obtained by substituting with an other atom or a substituent, at least one of three hydrogen atoms contained in the group represented by —$SiH_3$. In light of reactivity and the like, the silyl group is preferably a group having a hydroxy group, or a group having a group (an alkoxy group, etc.) in which a hydroxy group is to be generated by hydrolysis or the like.

The lower limit of a degree of modification with the silane coupling agent with respect to the total monomer units in the modified PVA is preferably 0.001 mol %, more preferably 0.005 mol %, still more preferably 0.01 mol %, yet more preferably 0.05 mol %, yet more preferably 0.10 mol %, and may be particularly preferably 0.16 mol %. Furthermore, the upper limit of the degree of modification with the silane coupling agent with respect to the total monomer units in the modified PVA is not particularly limited, and may be, for example, 0.30 mol %, or may be 0.25 mol %.

The degree of modification with the silane coupling agent is a degree of the silane coupling agent which has bonded. Specifically, the degree of modification with the silane coupling agent with respect to the total monomer units in the modified PVA means the number of structures derived from the silane coupling agent with respect to the number of the total monomer units in the modified PVA. For example, in the case of the modified PVA obtained by saponifying the copolymer of vinyl acetate and vinyltrimethoxysilane in the presence of methyltrimethoxysilane, described above, when one methyltrimethoxysilane, serving as the silane coupling agent, bonds, one structure derived from methyltrimethoxysilane is formed. Thus, a content (mol %) of the siloxane structure (the structure derived from methyltrimethoxysilane) with respect to the total monomer units, determined by the above formula (I), is equal to the degree of modification (mol %) with the silane coupling agent with respect to the total monomer units.

The lower limit of the degree of modification with the silyl group in the modified PVA is preferably 0.05 mol %, more preferably 0.08 mol %, and may be still more preferably 0.1 mol %. Furthermore, the upper limit of the degree of modification with the silyl group is preferably 1.0 mol %, more preferably 0.8 mol %, and may be still more preferably 0.5 mol %. When the degree of modification with the silyl group falls within the above range, an effect of the silyl group tends to be more favorably exhibited, and furthermore, the water solubility of the modified PVA to be obtained tends to be more favorable. It is to be noted that the degree of modification with the silyl group of the modified PVA in the present disclosure means the content of a total of a monomer unit derived from a silyl group-containing monomer (silyl group-containing species) with respect to the total monomer units in the modified PVA.

The total of the monomer unit derived from the silyl group-containing monomer include both of: the monomer unit derived from the silyl group-containing monomer and not being modified with the silane coupling agent; and the monomer unit derived from the silyl group-containing monomer and being modified with the silane coupling agent. In other words, the monomer unit having the group represented by the above formula (1) is also one of the monomer unit derived from the silyl group-containing monomer. Furthermore, a monomer unit modified by a means other than the modification with the silane coupling agent, such as hydrolysis, is also included in the monomer unit derived from the silyl group-containing monomer.

The degree of modification with the silyl group of the modified PVA can be determined by using, for example, $^1$H-NMR, and for example, the degree of modification with the silyl group of the modified PVA can be determined by using $^1$H-NMR to measure the silyl group-modified vinyl ester polymer, being the precursor of the modified PVA. For example, in the case of the modified PVA in which vinyltrimethoxysilane is used as the silyl group-containing modifying species, the degree of modification with the silyl group may be determined by using $^1$H-NMR to measure the silyl group-modified vinyl ester polymer, being the precursor of the modified PVA. An example of a specific measuring procedure in this case is as described below. Reprecipitation and purification of the silyl group-modified vinyl ester polymer, serving as the sample material, is carried out three or more times using a mixed solution of n-hexane and acetone, and then the sample material is dried at 80° C. under a reduced pressure for 3 days to produce a modified vinyl ester polymer for analysis. Next, the modified vinyl ester polymer for analysis is dissolved in DMSO-d6, and the measurement is carried out using $^1$H-NMR (400 MHz) at 20° C. The degree of modification with the silyl group can be calculated, in accordance with the following formula (II), from a peak (integrated value A: 4.5 to 5.2 ppm) derived from main chain methine protons of the vinyl ester unit measured, and a peak (integrated value B: 3.4 to 3.6 ppm) derived from methyl protons of the silyl group (trimethoxysilyl group):

$$\text{degree of modification with silyl group(mol \%)} = \{(B/9)/(A+B/9)\} \times 100 \quad \text{(II)}$$

The lower limit of the content, with respect to the total of the monomer unit derived from the silyl group-containing monomer in the modified PVA, of the group represented by the above formula (1), the group represented by the above formula (2), or the siloxane structure may be, for example, 40 mol %, and is preferably 50 mol %, and more preferably 60 mol %. Similarly, the lower limit of the degree of modification with the silane coupling agent with respect to the total of the monomer unit derived from the silyl group-containing monomer in the modified PVA may be, for example, 40 mol %, and is preferably 50 mol %, and more preferably 60 mol %. In such a case, the monomer unit derived from the silyl group-containing monomer is modified with the silane coupling agent in a high proportion, whereby the effect due to the modification with the silane coupling agent can be particularly sufficiently exhibited. The upper limit of the content, with respect to the total of the monomer unit derived from the silyl group-containing monomer in the modified PVA, of the group represented by the above formula (1), the group represented by the above formula (2), or the siloxane structure, and the upper limit of the degree of modification with the silane coupling agent with respect to the total of the monomer unit derived from the silyl group-containing monomer in the PVA may be, for example, 100 mol %. However, since a plurality of the silane coupling agent molecules may react with the monomer unit derived from the silyl group-containing monomer, the content, with respect to the total of the monomer unit derived from the silyl group-containing monomer in the modified PVA, of the group represented by the above formula (1), the group represented by the above formula (2), or the siloxane structure, and the degree of modification with the silane coupling agent with respect to the total of the monomer unit derived from the silyl group-containing monomer in the PVA may be greater than 100 mol %.

In addition to the monomer unit derived from the vinyl ester monomer (the vinyl alcohol unit and the vinyl ester unit) and the monomer unit derived from the silyl group-containing monomer, the modified PVA of the present disclosure may further contain monomer unit(s) derived from other monomer(s). For example, the modified PVA according to a preferred embodiment of the present disclosure contains an ethylene unit. A content of the ethylene unit (degree of modification with ethylene) with respect to the total monomer units in the modified PVA is preferably less than 20 mol %, and may be more preferably less than 10 mol %. When the degree of modification with ethylene falls within the above range, the water solubility of the modified PVA may be more favorable. The lower limit of the content of the ethylene unit (the degree of modification with ethylene) with respect to the total monomer units in the modified PVA may be, for example, 0.1 mol %, or may be 1 mol %. When the degree of modification with ethylene is greater than or equal to the lower limit, the water resistance of the film to be obtained can be further increased.

In the case in which the modified PVA contains the ethylene unit, a degree of modification with ethylene can be determined, for example, by using $^1$H-NMR. For example, similarly to the above-described degree of modification with the silyl group, the degree of modification with ethylene of the modified PVA can be determined by measuring the modified vinyl ester polymer, being the precursor of the modified PVA, by using $^1$H-NMR.

The lower limit of a proportion of the vinyl alcohol unit with respect to the total monomer units in the modified PVA of the present disclosure is preferably 35 mol %, more preferably 50 mol %, still more preferably 70 mol %, yet more preferably 80 mol %, and may be particularly preferably 90 mol %. On the other hand, the upper limit of the proportion of the vinyl alcohol unit may be preferably 99.95 mol %.

The upper limit of the content, with respect to the total monomer units in the modified PVA of the present disclosure, of the other monomer unit(s) aside from the monomer unit derived from the vinyl ester monomer, the monomer unit derived from the silyl group-containing monomer, and the ethylene unit is preferably 10 mol %, and may be more preferably 1 mol % or 0.1 mol %. In such a case, for example, the effect due to the modification with the silyl group can be more sufficiently exhibited.

A viscosity-average degree of polymerization of the modified PVA is preferably 100 or more and less than 5,000. The lower limit of the viscosity-average degree of polymerization of the modified PVA is more preferably 200, still more preferably 500, yet more preferably 1,000, and may be yet more preferably 2,000. Furthermore, the upper limit of the viscosity-average degree of polymerization of the modified PVA is more preferably 4,000, and may be still more preferably 3,000. When the viscosity-average degree of polymerization falls within the above range, the production tends to be further facilitated, and there is a tendency toward further superiority in mechanical properties at a time of film forming. The viscosity-average degree of polymerization is a value obtained by measurement based on JIS K 6726: 1994. Specifically, in a case of a degree of saponification of the modified PVA being less than 99.5 mol %, the viscosity-average degree of polymerization can be obtained for the modified PVA, having been saponified until the degree of saponification becomes 99.5 mol % or more, by the following formula using a limiting viscosity [η](L/g) measured in water at 30° C.:

$$P = ([\eta] \times 10^4 / 8.29)^{(1/0.62)}$$

The lower limit of the degree of saponification of the modified PVA is preferably 30 mol %, more preferably 65 mol %, still more preferably 70 mol %, yet more preferably 80 mol %, yet more preferably 85 mol %, and may be particularly preferably 90 mol %. On the other hand, the upper limit of the degree of saponification of the modified PVA is preferably 99.99 mol %, more preferably 99.0 mol %, and may be still more preferably 98.5 mol %. When the degree of saponification of the modified PVA falls within the above range, there is a tendency to enable further enhancing the water solubility-improving effect, and to enable industrially producing the modified PVA in a more stable manner. The degree of saponification of the modified PVA is measured in accordance with a procedure disclosed in JIS K 6726: 1994.

Method for Producing Modified Vinyl Alcohol Polymer

The method for producing a modified PVA of the present disclosure includes a step of saponifying a modified vinyl ester polymer having a silyl group in the presence of a silane coupling agent.

Furthermore, a preferred embodiment of the method for producing a modified PVA of the present disclosure includes: a step (polymerizing step) of copolymerizing a silyl group-containing monomer (silyl group-containing modifying species) with a vinyl ester monomer to give a silyl group-modified vinyl ester polymer; and a step (saponifying step) of saponifying the silyl group-modified vinyl ester polymer (the modified vinyl ester polymer having a silyl group) in the presence of a silane coupling agent. For example, due to the silyl group-modified vinyl ester polymer being saponified in the presence of the silane coupling agent as described above, a siloxane structure can be introduced into the modified PVA to be obtained, whereby the modified PVA can be obtained having the group represented by the formula (1). The silyl group-containing modifying species may be the same as the silane coupling agent, or each may be a different chemical species.

Polymerizing Step

The modified vinyl ester polymer, to be the precursor of the modified PVA of the present disclosure, can be produced by polymerizing the vinyl ester monomer with the silyl group-containing monomer, or further with the other monomer(s), by a conventionally well-known procedure such as a bulk polymerization procedure, a solution polymerization procedure, a suspension polymerization procedure, an emulsion polymerization procedure, or a dispersion polymerization procedure. In light of enhancing the effects of the present disclosure, the solution polymerization procedure, in which the polymerization is performed with a lower alcohol, is preferred. The lower alcohol is not particularly limited, and is preferably an alcohol having 3 or fewer carbon atoms, such as methanol, ethanol, propanol, and isopropanol; and is more preferably methanol. For a polymerization operation, any polymerization system selected from a batch system, a semi-batch system, and a continuous system may be employed.

Examples of the vinyl ester monomer include vinyl formate, vinyl acetate, vinyl propionate, vinyl butyrate, vinyl isobutyrate, vinyl pivalate, vinyl versatate, vinyl caprate, vinyl caprylate, vinyl laurate, vinyl palmitate, vinyl stearate, vinyl oleate, vinyl benzoate, and the like. Of these, vinyl acetate is preferred.

The silyl group-containing monomer (silyl group-containing modifying species) preferably has a structure represented by the following formula (4).

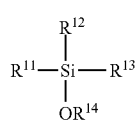

(4)

In the formula (4), $R^{11}$ represents a functional group having a polymerizable multiple bond; $R^{12}$ and $R^{13}$ each independently represent an alkyl group having 1 to 8 carbon atoms, an alkoxy group having an alkyl group having 1 to 8 carbon atoms, or an acetoxy group having an alkyl group having 1 to 8 carbon atoms; and $R^{14}$ represents an alkyl group having 1 to 8 carbon atoms, an aromatic hydrocarbon group, or an acetyl group.

The functional group having a polymerizable multiple bond represented by $R^{11}$ is preferably a group having an unsaturated carbon-carbon double bond, and examples thereof include a vinyl group, an allyl group, a styryl group, a (meth)acrylalkyl group, and the like.

$R^{12}$ and $R^{13}$ each represent preferably an alkoxy group having an alkyl group having 1 to 8 carbon atoms, and more preferably an alkoxy group having an alkyl group having 1 to 4 carbon atoms or further preferably, 1 or 2 carbon atoms.

Examples of the aromatic hydrocarbon group which may be represented by $R^{11}$ include a phenyl group, a tolyl group, a naphthyl group, and the like, and the phenyl group is preferred. $R^{14}$ represents preferably an alkyl group having 1 to 8 carbon atoms, and more preferably an alkyl group having 1 to 4 carbon atoms or further preferably, 1 or 2 carbon atoms.

Examples of the silyl group-containing monomer (the silyl group-containing modifying species) include vinyltrimethoxysilane, vinylmethyldimethoxysilane, vinyldimethylmethoxysilane, vinyltriethoxysilane, vinylmethyldiethoxysilane, vinyldimethylethoxysilane, allyltrimethoxysilane, allylmethyldimethoxysilane, allyldimethylmethoxysilane, allyltriethoxysilane, allylmethyldiethoxysilane, allyldimethylethoxysilane, vinyl-tris(β-methoxyethoxy)silane, vinylisobutyldimethoxysilane, vinylethyldimethoxysilane, vinylmethoxydibutoxysilane, vinyldimethoxybutoxysilane, vinyltributoxysilane, vinylmethoxydihexyloxysilane, vinyldimethoxyhexyloxysilane, vinyltrihexyloxysilane, vinylmethoxydioctyloxysilane, vinyldimethoxyoctyloxysilane, vinyltrioctyloxysilane, vinylmethoxydilauryloxysilane, vinyldimethoxylauryloxysilane, vinylmethoxydioleyloxysilane, vinyldimethoxyoleyloxysilane, 3-(meth)acrylamide-propyltrimethoxysilane, 3-(meth)acrylamide-propyltriethoxysilane, 3-(meth)acrylamide-propyltri(β-methoxyethoxy)silane, 2-(meth)acrylamide-ethyltrimethoxysilane, 1-(meth)acrylamide-methyltrimethoxysilane, 2-(meth)acrylamide-2-methylpropyltrimethoxysilane, 2-(meth)acrylamide-isopropyltrimethoxysilane, N-(2-(meth)acrylamide-ethyl)-aminopropyltrimethoxysilane, (3-(meth)acrylamide-propyl)-oxypropyltrimethoxysilane, 3-(meth)acrylamide-propyltriacetoxysilane, 2-(meth)acrylamide-ethyltriacetoxysilane, 4-(meth)acrylamide-butyltriacetoxysilane, 3-(meth)acrylamide-propyltripropionyloxysilane, 2-(meth)acrylamide-2-methylpropyltriacetoxysilane, N-(2-(meth)acrylamide-ethyl)-aminopropyltriacetoxysilane, 3-(meth)acrylamide-propylisobutyldimethoxysilane, 2-(meth)acrylamide-ethyldimethylmethoxysilane, 3-(meth)acrylamide-propylmethyldiacetoxysilane, 2-(meth)acrylamide-2-methylpropyl hydrogendimethoxysilane, 3-(N-methyl-(meth)acrylamide)-propyltrimethoxysilane, 2-(N-ethyl-(meth)acrylamide)-ethyltriacetoxysilane, styryltrimethoxysilane, and the like. Of these, vinyltrimethoxysilane may be preferably used in light of ease of industrial production and availability at low cost.

It is to be noted that in a case of the silyl group-containing monomer having an acyloxy group such as an acetoxy group (for example, in the above formula (4), in the case in which $R^{12}$ or $R^{13}$ represents an acetoxy group and the case in which $R^{14}$ represents an acetyl group), typically, a monomer unit having a hydroxy group or the like is formed by hydrolysis. The hydroxy group may be in a state of a salt. However, the monomer unit still in the state of the acyloxy group such as the acetoxy group may be present in the modified PVA.

Furthermore, in the modified PVA of the present disclosure, within a range not impairing the principles of the present disclosure, an other monomer aside from the vinyl ester monomer and the silyl group-containing monomer may also be subjected to copolymerization. Examples of the other monomer include:

- α-olefins such as ethylene, propylene, n-butene, and isobutylene;
- (meth)acrylic acid and salts thereof;
- (meth)acrylic acid esters such as methyl (meth)acrylate, ethyl (meth)acrylate, n-propyl (meth)acrylate, i-propyl (meth)acrylate, n-butyl (meth)acrylate, i-butyl (meth) acrylate, t-butyl (meth)acrylate, 2-ethylhexyl (meth) acrylate, dodecyl (meth)acrylate, and octadecyl (meth) acrylate;
- acrylamide compounds such as (meth)acrylamide, N-methyl(meth)acrylamide, N-ethyl(meth)acrylamide, N,N-dimethyl (meth)acrylamide, diacetone(meth)acrylamide, (meth)acrylamidepropanesulfonic acid and salts thereof, (meth)acrylamidepropyldimethylamine and salts thereof or quaternary salts thereof, and N-methylol(meth)acrylamide and derivatives thereof;
- vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether;
- nitriles such as acrylonitrile and methacrylonitrile;
- vinyl halides such as vinyl chloride and vinyl fluoride;
- vinylidene halides such as vinylidene chloride and vinylidene fluoride;
- allyl compounds such as allyl acetate and allyl chloride;
- unsaturated dicarboxylic acids such as maleic acid, itaconic acid, and fumaric acid, and salts or esters thereof;
- isopropenyl acetate; and the like.

These may be used either alone of one type, or in a combination of two or more types. A copolymerization amount of the other monomer (degree of modification with the other monomer) is preferably 10 mol % or less. It is to be noted that in the present disclosure, "(meth)acryl" is a general term for methacryl and acryl.

A polymerization initiator to be used in the polymerization may be selected from well-known initiators (for example, an azo type initiator, a peroxide type initiator, a redox type initiator, and the like). Examples of the azo type initiator include 2,2'-azobisisobutyronitrile, 2,2'-azobis(2,4-dimethylvaleronitrile), 2,2'-azobis(4-methoxy-2,4-dimethylvaleronitrile), and the like. Examples of the peroxide type initiator include: percarbonate compounds such as di-n-propyl peroxydicarbonate, diisopropyl peroxydicarbonate, di-2-ethylhexyl peroxydicarbonate, and diethoxyethyl peroxydicarbonate; perester compounds such as t-butyl peroxyneodecanoate, α-cumyl peroxyneodecanoate, and t-butyl peroxydecanate; acetylcyclohexylsulfonyl peroxide; 2,4,4-trimethylpentyl 2-peroxyphenoxyacetate; and the like. As the initiator, potassium peroxide, ammonium peroxide, hydrogen peroxide, or the like may be combined with these initiators. The redox type initiator may be exemplified by an initiator in which the peroxide is combined with a reducing agent such as sodium bisulfite, sodium bicarbonate, tartaric acid, L-ascorbic acid, or Rongalit. In a case of conducting the copolymerization at a high temperature, coloring may be seen, owing to decomposition of the vinyl ester monomer. In this case, with the aim of preventing the coloring, an antioxidant such as tartaric acid may be added to the polymerization system at a concentration of about 1 to 100 ppm with respect to the vinyl ester monomer.

A polymerization temperature is not particularly limited, and is preferably 0 to 180° C., more preferably 20 to 160° C., and still more preferably 30 to 150° C. When the polymerization is conducted at or below a boiling point of the solvent used in the polymerizing step, either of: boiling polymerization under reduced pressure, in which the polymerization is conducted while permitting the solvent to boil under reduced pressure; or non-boiling polymerization under normal pressure, in which the polymerization is conducted under conditions at which the solvent is not permitted to boil under normal pressure, may be selected. Further, when the polymerization is conducted at or above the boiling point of the solvent used in the polymerizing step, either of non-boiling polymerization under pressure, in which the polymerization is conducted under conditions at which the solvent is not permitted to boil under pressure; and boiling polymerization under pressure, in which the polymerization is conducted while permitting the solvent to boil under pressure, may be selected.

In the case of the modified PVA, being the one embodiment of the present disclosure, including the ethylene unit, i.e., in the case of the PVA being ethylene-modified, a production method thereof includes the copolymerization preferably conducted in the presence of both the vinyl ester monomer and the silyl group-containing monomer while applying pressure to the ethylene. Ethylene pressure inside a polymerization reactor at this time is not particularly limited, and is preferably 0.01 to 2.0 MPa, more preferably 0.05 to 1.0 MPa, and may be still more preferably 0.1 to 0.65 MPa. A conversion (rate of polymerization) of the vinyl ester monomer at an outlet of the polymerization reactor is not particularly limited, and is preferably 5 to 90%, and may be more preferably 15 to 85%.

Saponifying Step

The modified PVA of the preferred embodiment of the present disclosure can be obtained by saponifying, in the presence of the silane coupling agent, a silyl group-modified vinyl ester copolymer obtained by copolymerizing the vinyl ester monomer with the silyl group-containing monomer. In a procedure for the saponification reaction, for example, an alcoholysis reaction or a hydrolysis reaction may be carried out, each involving using a basic catalyst such as sodium hydroxide, potassium hydroxide, or sodium methoxide, or an acidic catalyst such as p-toluenesulfonate. Examples of the solvent which may be used in this saponification reaction include: alcohols such as methanol and ethanol; esters such as methyl acetate and ethyl acetate; ketones such as acetone and methyl ethyl ketone; aromatic hydrocarbons such as benzene and toluene; and the like. These solvents may be used either alone of one type, or in a combination of two or more types thereof. Of these, using methanol or a methanol/methyl acetate mixed solution as the solvent, and using sodium hydroxide as the catalyst to conduct the saponification is preferred due to convenience.

The silane coupling agent is a chemical species which enables introducing the group represented by the above formula (1). The silane coupling agent may be, for example, a silane group-containing modifying species (a silane group-containing monomer) having a structure represented by the above formula (4), may be a silane coupling agent having a structure represented by the following formula (5), or may be a mixture of these.

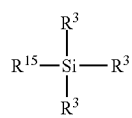

(5)

In the formula (5), $R^3$s are each defined as $R^3$ is defined in the formula (2); and $R^{15}$ represents an alkoxy group having an alkyl group having 1 to 5 carbon atoms, or a hydroxy group.

Specific modes and suitable forms of $R^3$ in the formula (5) are similar to the specific modes and suitable forms of $R^3$ in the formula (2). $R^{15}$ represents preferably the alkoxy group, and more preferably an alkoxy group having an alkyl group having 1 or 2 carbon atoms.

Examples of the silane coupling agent include: trimethylsilanol, methoxytrimethylsilane, dimethyldimethoxysilane, methyltrimethoxysilane, ethoxytrimethylsilane, diethoxydimethylsilane, triethoxymethylsilane, tetraethoxysilane, propoxytrimethylsilane, dipropoxydimethylsilane, tripropoxymethylsilane, tetrapropoxysilane, isopropoxytrimethylsilane, diisopropoxydimethylsilane, triisopropoxymethylsilane, tetraisopropoxysilane, butoxytrimethylsilane, dibutoxydimethylsilane, tributoxymethylsilane, tetrabutoxysilane, isobutoxytrimethylsilane, diisobutoxydimethylsilane, triisobutoxymethylsilane, tetraisobutoxysilane, tertiary butoxytrimethylsilane, di-tertiary butoxydimethylsilane, ti-tertiary butoxymethylsilane, tetra-tertiary butoxysilane, phenoxytrimethylsilane, diphenoxydimethylsilane, triphenoxymethylsilane, tetraphenoxysilane, methoxytriethylsilane, dimethoxydiethylsilane, trimethoxyethylsilane, ethoxytriethylsilane, diethoxydiethylsilane, triethoxyethylsilane, methoxytripropylsilane, dimethoxydipropylsilane, trimethoxypropylsilane, ethoxytripropylsilane, diethoxydipropylsilane, triethoxypropylsilane, trimethoxybutylsilane, trimethoxyheptylsilane, trimethoxyhexylsilane, trimethoxyoctylsilane, trimethoxydecylsilane, trimethododecylsilane, trimethoxytetradecylsilane, trimethoxyoctadecylsilane, trimethoxyphenylsilane, trimethoxybenzylsilane, triethoxybutylsilane, triethoxyheptylsilane, triethoxyhexylsilane, triethoxyoctylsilane, triethoxydecylsilane, triethoxydodecylsilane, triethoxytetradecylsilane, triethoxyoctadecylsilane, phenyltriethoxysilane, triethoxybenzylsilane, mercaptomethyltrimethoxysilane, 3-mercaptopropyltrimethoxysilane, 3-chloropropyltrimethoxysilane, 3-bromopropyltrimethoxysilane, 3-aminopropyltrimethoxysilane, mercaptomethyltriethoxysilane, 3-mercaptopropyltriethoxysilane, 3-chloropropyltriethoxysilane, 3-bromopropyltriethoxysilane, 3-aminopropyltriethoxysilane, vinyltrimethoxysilane, and the like. Of these, methoxytrimethylsilane, dimethoxydimethylsilane, methyltrimethoxysilane, ethoxytrimethylsilane, diethoxydimethylsilane, triethoxymethylsilane, vinyltrimethoxysilane, and the like may be suitably used.

Aqueous Solution

The aqueous solution of the present disclosure is an aqueous solution containing the modified PVA of the present disclosure. In the aqueous solution of the present disclosure, a small amount of an organic solvent may be included, and further, a small amount of a water-insoluble organic particle or inorganic particle may be included. A concentration of the modified PVA in the aqueous solution is preferably 1 to 30% by mass.

Intended Usage

The modified PVA of the present disclosure may be used in a variety of intended usages. Examples thereof are given below, but are not limited thereto.

(1) Dispersant usages: dispersion stabilizers for pigments contained in coating materials, adhesives, and the like; and dispersion stabilizers and dispersion aids for suspension polymerization of various vinyl compounds such as vinyl chloride, vinylidene chloride, styrene, (meth)acrylate, and vinyl acetate;

(2) Coating agent usages: paper coating agents, sizing agents, textile processing agents, leather finishing agents, paints, anti-fogging agents, metal corrosion inhibitors, gloss agents for zinc plating, and antistatic agents;

(3) Adhesive usages: adhesives, pressure sensitive adhesives, rewetting adhesives, various binders, and additives for cements and mortars;

(4) Emulsifier usages: emulsifiers for emulsion polymerization, and post-emulsifiers for bitumen and the like;

(5) Flocculant usages: flocculants for suspended and dissolved matter in water, and metal flocculants;

(6) Paper processing usages: paper strength enhancers, oil- and solvent-resistance imparting agents, smoothness-improving agents, auxiliary agents for surface gloss improvement, sealing agents, barrier agents, light resistance imparting agents, waterproofing agents, dispersants for dyes and color-developing agents, adhesion improving agents, and binders;

(7) Agricultural usages: agrichemical binders, agrichemical spreading agents, agricultural coating agents, soil improvers, erosion-preventing agents, and agrichemical dispersants;

(8) Medicine and cosmetic usages: granulating binders, coating agents, emulsifiers, patches, binders, film formulation bases, and film-forming agents;

(9) Viscosity adjustment agent usages: thickeners and rheology adjusters;

(10) Film usages: water-soluble films, polarizing films, barrier films, textile-wrapping films, seedling-protecting sheets, vegetation sheets, seed tapes, and hygroscopic films;

(11) Molded item usages: fibers, pipes, tubes, leak-proof films, water-soluble fibers for chemical laces, and sponges;

(12) Gel usages: medical gels and industrial gels; and

(13) Post-reaction usages: usages for post-reactions with low-molecular organic compounds, high-molecular organic compounds, and inorganic compounds.

EXAMPLES

Hereinafter, the present invention is explained in further detail by way of Examples, but the present invention is not in any way limited to these Examples. It is to be noted that unless otherwise specified particularly, in the following Examples and Comparative Examples, "parts" and "%" refer to parts by mass and % by mass, respectively.

Degree of Modification with Silyl Group of Modified PVA

The degree of modification with the silyl group of the modified PVA was determined by $^1$H-NMR. For example, in a case of the modified PVA produced by using vinyltrimethoxysilane as the silane group-containing modifying species, the following procedure was carried out. First, as a sample for measurement, a modified vinyl ester polymer for analysis was produced by: subjecting the silyl group-modified vinyl ester polymer, being the precursor of the modified PVA, to reprecipitation three or more times by using a mixed solution of n-hexane and acetone; and then drying under reduced pressure at 80° C. for 3 days. The modified vinyl ester polymer for analysis thus obtained was dissolved in DMSO-d6, and measured using $^1$H-NMR (400 MHz) at 20° C. The degree of modification with the silyl group was calculated by the following formula (II) by using a peak (integrated value A: 4.5 to 5.2 ppm) derived from main chain methine protons of the vinyl ester unit measured, and a peak (integrated value B: 3.4 to 3.6 ppm) derived from methyl protons of the silyl group (trimethoxysilyl group).

$$\text{Degree of modification with silyl group(mol \%)} = \{(B/9)/(A+B/9)\} \times 100 \quad \text{(II)}$$

Degree of Modification with Ethylene of Modified PVA

The degree of modification with ethylene of modified PVA 7, described later, was determined from $^1$H-NMR of a precursor of the modified PVA 7 by a similar procedure to the measurement of the degree of modification with the silyl group.

Content of Siloxane Structure in Modified PVA

A content of the siloxane structure in the modified PVA was measured using $^1$H-NMR. For example, in the case of modified PVA 1, described later, when the modified PVA 1 obtained is dissolved in $D_2O$ and measured at room temperature using $^1$H-NMR at 400 MHz, a methine group-derived peak of the vinyl alcohol unit is attributed to 3.3 to 4.2 ppm (integrated value α), and a methyl group-derived peak in the structure derived from the methyltrimethoxysilane is attributed to about −0.5 to 0.5 ppm (integrated value β). Using these integrated values α and β, the content of the structure derived from methyltrimethoxysilane, i.e., the content of the siloxane structure with respect to total monomer units, was calculated by the following formula (I).

$$\text{Content of siloxane structure(mol \%)} = \{(\beta/3)/(\alpha+\beta/3)\} \times 100 \quad \text{(I)}$$

It is to be noted that the content of the siloxane structure determined by the above procedure is equal to the content of the group represented by the above formula (2), and to the degree of modification with the silane coupling agent. Furthermore, it is considered that the content of the siloxane structure determined by the above procedure is substantially equal to the content of the group represented by the above formula (1).

Viscosity-Average Degree of Polymerization of Modified PVA

The viscosity-average degree of polymerization of the modified PVA was determined in accordance with JIS K 6726: 1994. Specifically, in a case of the PVA having a degree of saponification of less than 99.5 mol %, the viscosity-average degree of polymerization was determined by the following formula using a limiting viscosity [η] (liters/g) measured in water at 30° C. for the PVA obtained after being saponified to give the degree of saponification of 99.5 mol % or more.

$$P = ([\eta] \times 10^4 / 8.29)^{(1/0.62)}$$

Degree of Saponification of Modified PVA

The degree of saponification of the modified PVA was determined in accordance with JIS K 6726: 1994.

Insoluble Content of Modified PVA

A 500 mL flask equipped with an agitator and a reflux condenser was placed in a water bath set to 20° C. 285 g of distilled water was charged into the flask, and stirring was started at 300 rpm. 15 g of a modified PVA was weighed out, and the modified PVA was gradually charged into the flask. Immediately after the modified PVA (15 g) was charged into the flask, a temperature of the water bath was elevated to 95° C. over a time period of about 30 mins. After the temperature reached 95° C., the dissolution was continued while further stirring the mixture at 300 rpm for 60 mins, and a resulting mixture was then filtered through a metal filter with a mesh opening size of 63 μm to trap undissolved, remaining particles (undissolved particles). The filter was thoroughly washed with hot water at 90° C. to remove the solution attached to the filter, and then the filter was dried for 1 hour with a heating drier at 120° C. A proportion of insoluble component(s) in the aqueous solution was calculated from a mass of the undissolved particles thus collected, and was defined as an insoluble content (%). This insoluble content is an indicator of the water solubility, and the insoluble content being lower indicates the water solubility being more favorable. Specifically, the modified PVA was evaluated in accordance with the following criteria based on the insoluble content, and was assessed as being superior in the water solubility, in a case of the evaluation being A or B.

A: less than 0.5%
B: 0.5% or more and less than 2.0%
C: 2.0% or more

Viscosity of Aqueous Solution of Modified PVA

A 300 mL flask equipped with an agitator and a reflux condenser was placed in a water bath set to room temperature. 192 g of distilled water was charged into the flask, and stirring was started at 300 rpm. 8 g of a modified PVA was weighed out, and the modified PVA was gradually charged into the flask. Immediately after the modified PVA (8 g) was charged into the flask, a temperature of the water bath was elevated to 95° C. over a time period of about 30 mins. After the temperature reached 90° C., the dissolution was continued while further stirring the mixture at 300 rpm for 2 hours, the temperature of the water bath was brought to room temperature, and the flask was gradually cooled with stirring. The aqueous solution thus obtained was transferred to a 100 ml sample tube and the viscosity at a rotation speed of 60 rpm was measured at 20° C. by using B-type viscometer BLII (manufactured by Toki Sangyo Co., Ltd) and defined as viscosity immediately after dissolving (mPa·s). Next, the aqueous solution was stored at 5° C. for 48 hours, and then the viscosity was measured at 20° C. by a procedure similar to that described above and defined as post-storage viscosity (mPa·s). A difference between the post-storage viscosity and the viscosity immediately after dissolving thus obtained is an indicator of the viscosity stability, with the viscosity difference being smaller indicating the viscosity stability being more favorable. Specifically, an evaluation was carried out in accordance with the following criteria based on the viscosity difference, and superiority in the viscosity stability was assessed in a case of $A^{30}$, A, or B.

$A^+$: less than 1 mPa·s
A: 1 mPa·s or more and less than 5 mPa·s
B: 5 mPa·s or more and less than 10 mPa·s
C: 10 mPa·s or more Degree of Swelling of Film A 4% by mass aqueous solution of the modified PVA was prepared by a procedure similar to that described above, and this aqueous solution was subjected to flow casting at 20° C. to give a film having a thickness of 50 μm. The film thus obtained was cut out to a size of 10 cm in length and 10 cm in width to produce a test piece. This test piece was immersed in distilled water at 20° C. for 24 hours, and then taken out and recovered. Moisture attached to a surface thereof was wiped off using gauze, and a mass in a state of water swelling was measured. Subsequently, the test piece for which the mass in the state of the water swelling was measured was dried at 105° C. for 16 hours, and then a mass after the drying was measured. At this time, a value obtained by dividing the mass during the water swelling by the mass after the drying was determined and defined as a degree of swelling of the film (%), and was adopted as an indicator of the water resistance of the film. The degree of swelling of the film being lower indicates the water resistance of the film being more superior. Specifically, an evaluation was carried out in accordance with the following criteria based on the degree of swelling of the film, and superiority in the water resistance of the film was assessed in a case of A+, A, or B.

A+: 300% or less
A: more than 300% and 400% or less
B: more than 400% and 500% or less
C: more than 500%

Example 1

Production of Modified PVA 1

Into a 3 L reactor equipped with a stirrer, a reflux condenser, a nitrogen inlet tube, a comonomer dropping port, and an initiator addition port, 850 g of vinyl acetate, 150 g of methanol, and 1.6 g of vinyltrimethoxysilane as a silyl group-containing modifying species were charged, and replacement with nitrogen in the system was carried out for 30 mins while bubbling nitrogen. Furthermore, a comonomer solution was prepared as a delay solution by dissolving vinyltrimethoxysilane in methanol to have a concentration of 10%, and replacement with nitrogen was carried out by bubbling nitrogen gas. A raise in temperature of the reactor was started, and when the internal temperature reached at 60° C., 0.2 g of 2,2'-azobisisobutyronitrile (AIBN) was added to start polymerization. While the delay solution was added dropwise to keep the monomer composition (ratio of vinyl acetate and vinyltrimethoxysilane) in the polymerization solution constant, the polymerization was carried out at 60° C. for 3 hours, and then 0.4 g of hydroquinone was added and cooling was performed to terminate the polymerization. The total amount of the comonomer (silyl group-containing modifying species) added until stopping the polymerization was 2.6 g. The solid content concentration when terminating the polymerization was 24.8%, and the conversion was 30%. Subsequently, while occasionally adding methanol at 50° C. under reduced pressure, unreacted vinyl acetate monomer was eliminated to obtain a methanol solution (concentration of 35%) of a silyl group-modified vinyl ester polymer. Methanol was further added thereto to prepare 571.4 g of a methanol solution of the silyl group-containing vinyl ester polymer (200.0 g of the silyl group-modified vinyl ester polymer in the solution), and 3.17 g of methyltrimethoxysilane was added as a silane coupling agent and mixed thoroughly. Thereafter, 27.9 g of an alkali solution (a 10% methanol solution of sodium hydroxide) was added to a resulting mixture and saponification was carried out (silyl group-modified vinyl ester polymer concentration of saponification solution: 25%; molar ratio of silane coupling agent to vinyl acetate unit:1.0 mol %; molar ratio of sodium hydroxide to vinyl acetate unit:3.0 mol %). Since a gelatinous matter was generated about 1 minute after adding the alkali solution, this was ground by a grinder and was left at 40° C. for 1 hour to allow the saponification to proceed, followed by addition of 500 g of methyl acetate to neutralize residual alkali. After confirming the completion of neutralization using a phenolphthalein indicator, the mixture was filtered to obtain a white solid, 2,000 g of methanol was added thereto, and the mixture was left to stand at room temperature for 3 hours to permit washing. After this washing operation was repeated three times, a white solid obtained by deliquoring through centrifugation was left to stand in a dryer at 65° C. for 2 days to give the modified PVA 1. The viscosity-average degree of polymerization of the modified PVA 1 was 2,500, the degree of saponification was 98.5 mol %, the degree of modification with the silyl group was 0.30 mol %, and the content of the siloxane structure was 0.20 mol %. The modified PVA 1 thus obtained was evaluated on the water solubility, the viscosity stability of the aqueous solution, and the water resistance of the film. The results are shown in Table 2.

Examples 2 to 5, Comparative Example 1

Production of Modified PVAs 2 to 6

Modified PVAs 2 to 6 were produced by a similar operation to the production of the modified PVA 1 in Example 1, except that the polymerization conditions (the usage amount of vinyl acetate, the usage amount of methanol, the type and the usage amount of the silyl group-containing modifying species, and the conversion) and the saponification conditions (the type and the usage amount of the silane coupling agent and the molar ratio of sodium hydroxide to the modified vinyl ester polymer) were changed as shown in Table 1. Analysis results for each modified PVA thus obtained are shown in Table 2. Furthermore, similarly to Example 1, the modified PVAs 2 to 6 thus obtained were each evaluated on the water solubility, the viscosity stability of the aqueous solution, and the water resistance of the film. The results are shown in Table 2.

Example 6

Production of Modified PVA 7

In a 5 L pressure reactor equipped with a stirrer, a reflux condenser, an ethylene inlet tube, and a delay solution addition port, 2,760 g of vinyl acetate, 240 g of methanol, and 6.4 g of vinyltrimethoxysilane as a silyl group-containing modifying species were charged, the temperature was raised to 60° C., and replacement with nitrogen in the system was carried out for 30 mins by bubbling nitrogen. Next, ethylene was introduced such that reactor pressure reached 0.32 MPa. A temperature in the reactor was adjusted to 60° C., and then 0.3 g of 2,2'-azobisisobutyronitrile (AIBN) was injected to start polymerization. During the polymerization, while injecting a 5% by mass methanol solution of vinyltrimethoxysilane, ethylene was introduced to maintain the reactor pressure at 0.32 MPa and the polymerization temperature at 60° C., and after 4 hours, when the conversion reached 25%, cooling was performed to terminate the polymerization. The total amount of vinyltrimethoxysilane added until the completion of the polymerization was 90 ml. Subsequently, saponification was carried out by conditions described in Table 1 by a procedure similar to that of Example 1 to produce the modified PVA 7. The analysis results and evaluation results of the PVA 7 are shown in Table 2.

TABLE 1

| | | Polymerization conditions | | | | | | Saponification conditions | | |
|---|---|---|---|---|---|---|---|---|---|---|
| | | vinyl acetate | methanol | silyl group-containing modifying species | | ethylene | conversion | silane coupling agent | | NaOH addition amount |
| | PVA | (g) | (g) | type | (g) | (MPa) | (%) | type | (mol %) | (mol %) |
| Example 1 | Modified PVA 1 | 850 | 150 | vinyltrimethoxysilane | 2.6 | — | 30 | methyltrimethoxysilane | 1.0 | 3.0 |
| Comparative Example 1 | Modified PVA 2 | 850 | 150 | vinyltrimethoxysilane | 2.6 | — | 30 | none | — | 2.5 |
| Example 2 | Modified PVA 3 | 850 | 150 | vinyltriethoxysilane | 3.0 | — | 30 | dimethyldimethoxysilane | 1.0 | 3.0 |
| Example 3 | Modified PVA 4 | 850 | 150 | vinyltrimethoxysilane | 2.6 | — | 30 | vinyltrimethoxysilane | 1.0 | 3.0 |
| Example 4 | Modified PVA 5 | 850 | 150 | vinyltrimethoxysilane | 2.6 | — | 30 | 3-aminopropyltrimethoxysilane | 1.0 | 3.0 |
| Example 5 | Modified PVA 6 | 850 | 150 | vinyltrimethoxysilane | 2.6 | — | 30 | phenyltriethoxysilane | 1.0 | 3.0 |
| Example 6 | Modified PVA 7 | 2,760 | 240 | vinyltrimethoxysilane | 6.4 | 0.32 | 25 | vinyltrimethoxysilane | 0.2 | 4.0 |

TABLE 2

| | | PVA analysis results | | | | | Evaluation results | | |
|---|---|---|---|---|---|---|---|---|---|
| | PVA | viscosity-average degree of polymerization | degree of saponification (mol %) | degree of modification with silyl group (mol %) | siloxane structure content (mol %) | degree of modification with ethylene (mol %) | insoluble content (%) | viscosity immediately after dissolving (mPa·s) | post-storage viscosity (mPa·s) |
| Example 1 | Modified PVA 1 | 2,500 | 98.5 | 0.30 | 0.20 | — | <0.1 | 75 | 77 |
| Comparative Example 1 | Modified PVA 2 | 2,500 | 98.5 | 0.30 | — | — | >5.0 | — | — |
| Example 2 | Modified PVA 3 | 2,500 | 98.5 | 0.30 | 0.18 | — | <0.1 | 68 | 68 |
| Example 3 | Modified PVA 4 | 2,500 | 98.5 | 0.30 | 0.19 | — | <0.1 | 72 | 74 |
| Example 4 | Modified PVA 5 | 2,500 | 98.5 | 0.30 | 0.15 | — | <0.1 | 74 | 76 |
| Example 5 | Modified PVA 6 | 2,500 | 98.5 | 0.30 | 0.15 | — | <0.1 | 71 | 74 |
| Example 6 | Modified PVA 7 | 2,500 | 99.0 | 0.30 | 0.02 | 2.5 | <0.1 | 75 | 76 |

| | | Evaluation results | | | | |
|---|---|---|---|---|---|---|
| | PVA | viscosity difference (mPa·s) | degree of swelling of film (%) | water solubility | viscosity stability | water resistance of film |
| Example 1 | Modified PVA 1 | 2 | 350 | A | A | A |
| Comparative Example 1 | Modified PVA 2 | — | — | C | — | — |
| Example 2 | Modified PVA 3 | 0 | 420 | A | A+ | B |
| Example 3 | Modified PVA 4 | 2 | 370 | A | A | A |
| Example 4 | Modified PVA 5 | 2 | 360 | A | A | A |
| Example 5 | Modified PVA 6 | 3 | 340 | A | A | A |
| Example 6 | Modified PVA 7 | 1 | 300 | A | A | A+ |

As shown in Table 2, the modified PVAs of Examples 1 to 6 were superior in the water solubility, the viscosity stability of the aqueous solution, and the water resistance of the film. Conversely, the modified PVA 2 of Comparative Example 1, which was produced without using the silane coupling agent during the saponification, had a large amount of insoluble content and was inferior in the water solubility, which may be due to not having the group represented by the formula (1); and physical property measurements regarding the viscosity stability and the water resistance of the film could not be carried out.

The invention claimed is:

1. A modified vinyl alcohol polymer, wherein the modified vinyl alcohol polymer has a content of water-insoluble matter of less than 0.5% by mass and comprises a group of formula (1):

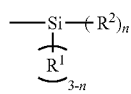
(1)

in which:
R$^1$ is an alkyl group having 1 to 8 carbon atoms; an alkoxy group comprising an alkyl group having 1 to 8 carbon atoms; a hydroxy group; or a group represented by –OM, wherein M represents an alkali metal or an alkaline earth metal,
R$^2$ is a siloxane structure of formula (2):

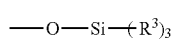
(2)

in which:
each R$^3$ is independently an alkyl group having 1 to 20 carbon atoms; an alkoxy group comprising an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal,
n is an integer of 1 2, or 3,
wherein when formula (1) comprises more than one R$^1$, each R$^1$ is identical or different from each other; and when formula (1) comprises more than one R$^2$, each R$^2$ is identical or different from each other, and
wherein, when n is an integer of 1 or 2, at least one R$^1$ is an alkoxy group comprising an alkyl group having 1 to 8 carbon atoms; a hydroxy group; or a group represented by –OM, wherein M represents an alkali metal or an alkaline earth metal, and/or
wherein at least one R$^3$ is an alkoxy group comprising an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal.

2. The modified vinyl alcohol polymer according to claim 1, wherein

(2)

each R$^3$ is independently an alkoxy group comprising an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal.

3. The modified vinyl alcohol polymer according to claim 1, wherein a content of the siloxane structure with respect to total monomer units in the modified vinyl alcohol polymer is 0.001 mol % or more.

4. The modified vinyl alcohol polymer according to claim 1, wherein a content of the siloxane structure with respect to a total of a monomer unit derived from a silyl group-containing monomer in the modified vinyl alcohol polymer is 50 mol % or more.

5. The modified vinyl alcohol polymer according to claim 1, wherein the modified vinyl alcohol comprises a monomer unit which is derived from a silyl group-containing monomer and modified with a silane coupling agent.

6. The modified vinyl alcohol polymer according to claim 5, wherein a degree of modification with the silane coupling agent with respect to total monomer units in the modified vinyl alcohol polymer is 0.001 mol % or more.

7. The modified vinyl alcohol polymer according to claim 5, wherein a degree of modification with the silane coupling agent with respect to a total of the monomer unit derived from the silyl-containing monomer in the modified vinyl alcohol polymer is 50 mol % or more.

8. An aqueous solution comprising the modified vinyl alcohol polymer according to claim 1.

9. The modified vinyl alcohol polymer according to claim 1, wherein a content of the siloxane structure with respect to total monomer units in the modified vinyl alcohol polymer is from 0.001 to 0.30 mol %.

10. The modified vinyl alcohol polymer according to claim 1, wherein n is an integer of 1 or 2, and at least one R$^1$ is an alkoxy group comprising an alkyl group having 1 to 8 carbon atoms; a hydroxy group; or a group represented by –OM, wherein M represents an alkali metal or an alkaline earth metal.

11. The modified vinyl alcohol polymer according to claim 1, wherein n is an integer of 1 or 2, and R$^1$ is an alkoxy group comprising an alkyl group having 1 to 8 carbon atoms; a hydroxy group; or
a group represented by –OM, wherein M represents an alkali metal or an alkaline earth metal.

12. The modified vinyl alcohol polymer according to claim 1, wherein at least one R$^3$ is an alkoxy group comprising an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal.

13. The modified vinyl alcohol polymer according to claim 1, wherein n is an integer of 1 or 2, and at least one $R^1$ is an alkoxy group comprising an alkyl group having 1 to 8 carbon atoms; a hydroxy group; or a group represented by –OM, wherein M represents an alkali metal or an alkaline earth metal, and at least one $R^3$ is an alkoxy group comprising an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal.

14. The modified vinyl alcohol polymer according to claim 1, wherein the modified vinyl alcohol polymer comprises a monomer unit of formula (3):

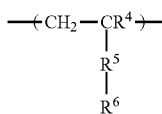

(3)

in which:
$R^4$ is a hydrogen atom or a methyl group;
$R^5$ is a single bond or a divalent linking group; and
$R^6$ is the group of formula (1).

15. A method for producing a modified vinyl alcohol polymer, the method comprising saponifying, in the presence of a silane coupling agent, a modified vinyl ester polymer comprising a silyl group, wherein the modified vinyl alcohol polymer has a content of water-insoluble matter of less than 0.5% by mass and comprises a group of formula (1):

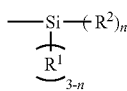

(1)

in which:
$R^1$ is an alkyl group having 1 to 8 carbon atoms; an alkoxy group comprising an alkyl group having 1 to 8 carbon atoms; a hydroxy group; or a group represented by –OM, wherein M represents an alkali metal or an alkaline earth metal,
$R^2$ is a siloxane structure of formula (2):

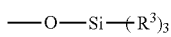

(2)

in which:
each $R^3$ is independently an alkyl group having 1 to 20 carbon atoms; an alkoxy group comprising an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal,
n is an integer of 1 2, or 3,
wherein when formula (1) comprises more than one $R^1$, each $R^1$ is identical or different from each other; and when formula (1) comprises more than one $R^2$, each $R^2$ is identical or different from each other, and
wherein, when n is an integer of 1 or 2, at least one $R^1$ is an alkoxy group comprising an alkyl group having 1 to 8 carbon atoms; a hydroxy group; or a group represented by –OM, wherein M represents an alkali metal or an alkaline earth metal, and/or
wherein at least one $R^3$ is an alkoxy group comprising an alkyl group having 1 to 8 carbon atoms; an alkenyl group having 2 to 5 carbon atoms; a phenyl group; a benzyl group; a halogenated alkyl group having 1 to 8 carbon atoms; a halogenated phenyl group; an aminoalkyl group having 1 to 8 carbon atoms; a mercaptoalkyl group having 1 to 8 carbon atoms; a hydroxy group; or a group represented by –OQ, wherein Q represents an alkali metal or an alkaline earth metal.

16. The method according to claim 15, wherein the silane coupling agent has a structure of formula (5):

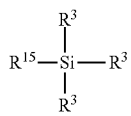

(5)

in which:
$R^{15}$ is an alkoxy group having an alkyl group having 1 to 5 carbon atoms or a hydroxy group.

17. The modified vinyl alcohol polymer according to claim 15, wherein the silane coupling agent comprises methoxytrimethylsilane, dimethoxydimethylsilane, methyltrimethoxysilane, ethoxytrimethylsilane, diethoxydimethylsilane, triethoxymethylsilane, or vinyltrimethoxysilane.

18. The method according to claim 15, the method further comprising copolymerizing a silyl group-containing monomer with a vinyl ester monomer to form the modified vinyl ester polymer comprising a silyl group.

19. The method according to claim 18, wherein the silyl group-containing monomer has a structure of formula (4):

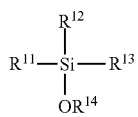

(4)

in which:
$R^{11}$ is a functional group having a polymerizable multiple bond;
$R^{12}$ and $R^{13}$ are each independently an alkyl group having 1 to 8 carbon atoms, an alkoxy group having an alkyl group having 1 to 8 carbon atoms, or an acetoxy group having an alkyl group having 1 to 8 carbon atoms; and
$R^{14}$ is an alkyl group having 1 to 8 carbon atoms, an aromatic hydrocarbon group, or an acetyl group.

20. The method according to claim 19, wherein $R^{11}$ is a functional group having an unsaturated carbon-carbon double bond.

* * * * *